United States Patent
Azagury et al.

(10) Patent No.: US 6,996,588 B2
(45) Date of Patent: Feb. 7, 2006

(54) EFFICIENT APPLICATION DEPLOYMENT ON DYNAMIC CLUSTERS

(75) Inventors: Alain Azagury, Nesher (IL); Yair Koren, Haifa (IL); Benny Rochwerger, Zichron Yaakov (IL); Arie Tal, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 719 days.

(21) Appl. No.: 10/044,161

(22) Filed: Jan. 7, 2002

(65) Prior Publication Data

US 2002/0165864 A1 Nov. 7, 2002

Related U.S. Application Data

(60) Provisional application No. 60/260,330, filed on Jan. 8, 2001.

(51) Int. Cl.
G06F 17/30 (2006.01)

(52) U.S. Cl. .................. 707/204; 707/202; 707/200
(58) Field of Classification Search ......... 707/200–205, 707/1–104.1; 717/121, 175
See application file for complete search history.

(56) References Cited

U.S. PATENT DOCUMENTS 5,678,042 A * 10/1997 Pisello et al. ............. 714/47
6,725,453 B1 * 4/2004 Lucas et al. .............. 717/178

OTHER PUBLICATIONS

M. Satyanarayanan, "Coda: A Highly Available File System for a Distributed Workstation Environment", IEE Transactions on Computers, Apr. 1990, vol. 39(4).
The RPM Product [online] Retrieved on Mar. 17, 2002, from the internet <URL: http://www.redhat.com/ >.
Ghost™, [online] Retrieved Mar. 17, 2002, from the Internet: <URL: http://www.symantec.com/ghost >.
U.S. Provisional Appl. No. 60/260,330, entitled " Efficient Application Deployment on Dynamic Clusters", filed Jan. 8, 2001.

* cited by examiner

*Primary Examiner*—Charles Rones
*Assistant Examiner*—Neveen Abel-Jalil
(74) *Attorney, Agent, or Firm*—Browdy and Neimark, PLLC

(57) ABSTRACT

A cluster application deployment model provides an efficient computer implemented technique for the deployment of applications on a shared file system, and includes an automated mechanism for mapping the shared application image into the local file system of a new node of a cluster.

69 Claims, 8 Drawing Sheets

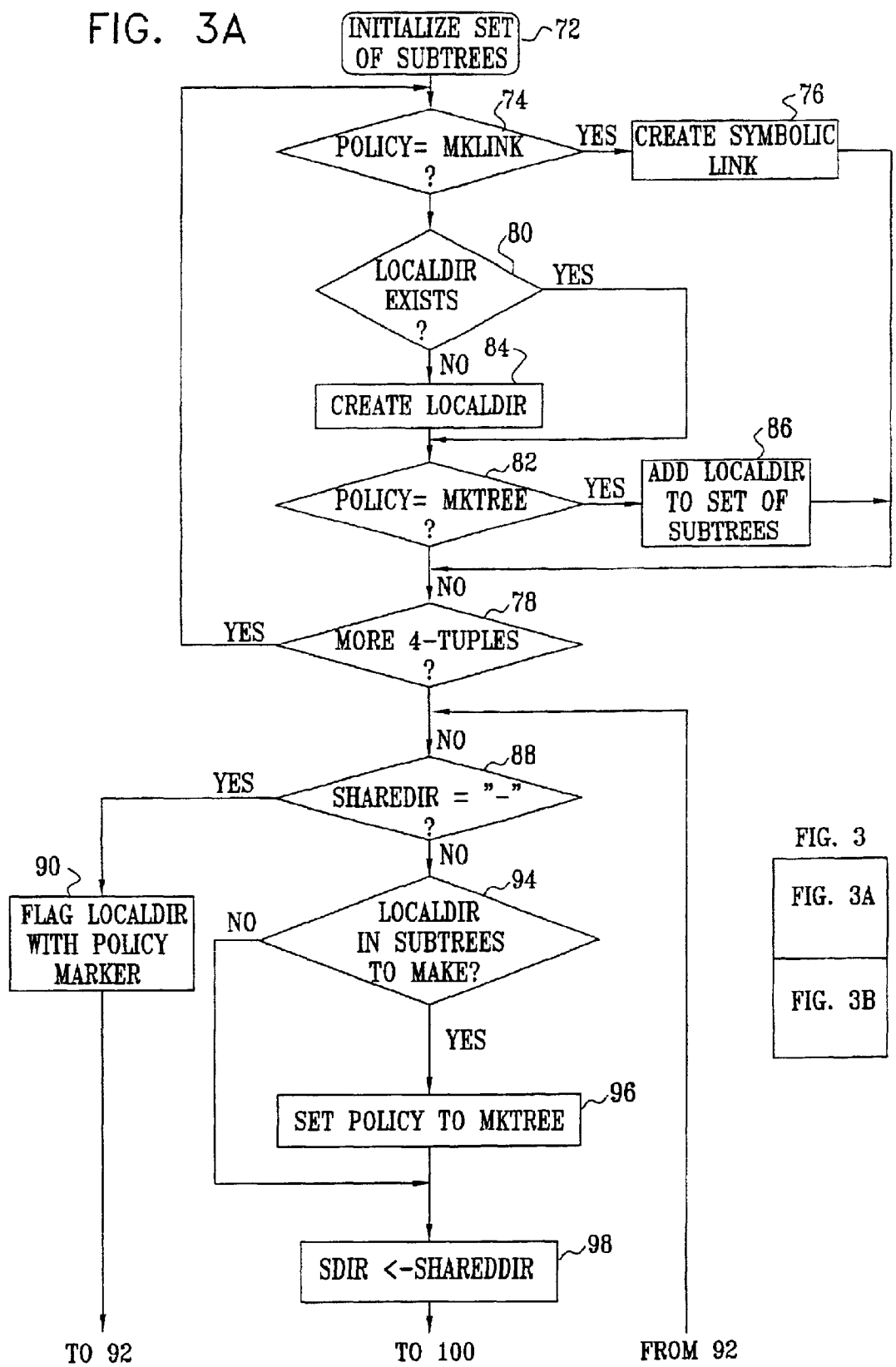

| FIG. 4A | FIG. 4B | FIG. 4C |

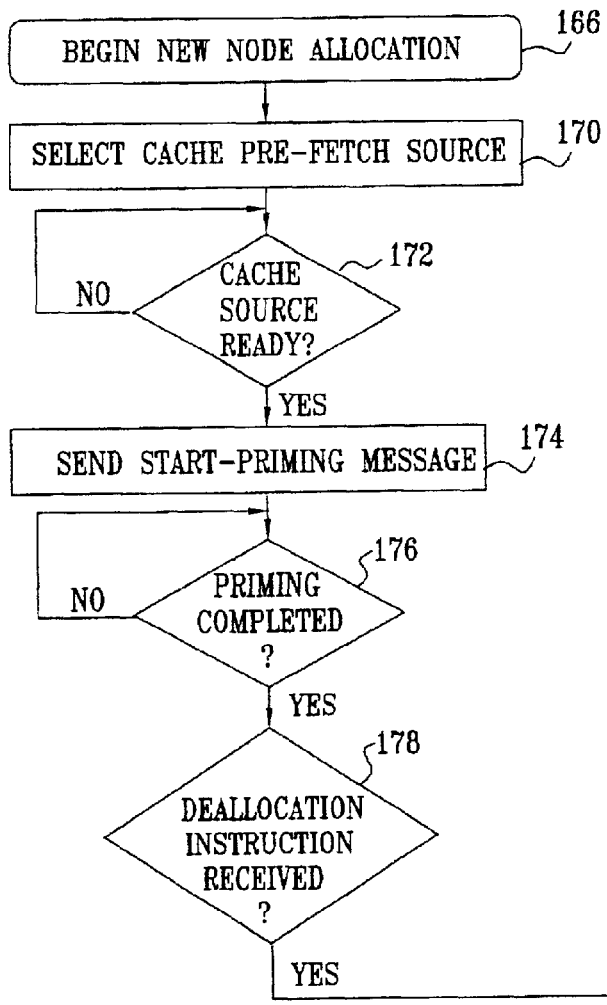
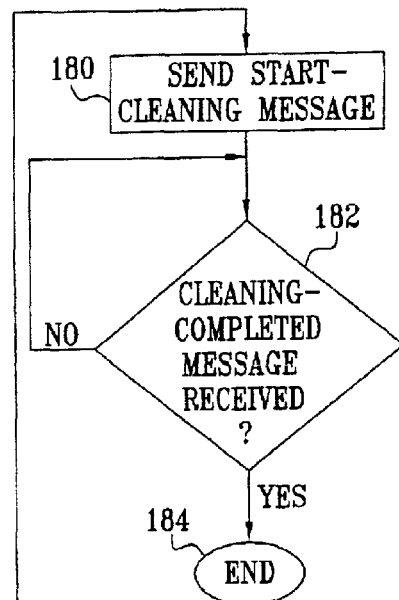
FIG. 6
FIG. 7
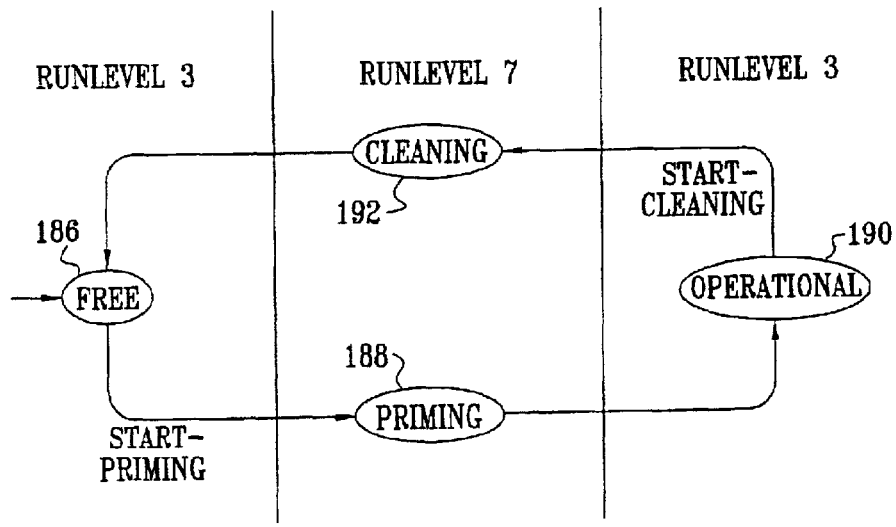

EFFICIENT APPLICATION DEPLOYMENT ON DYNAMIC CLUSTERS

CROSS-REFERENCE TO RELATED APPLICATIONS

This Application claims the benefit of Provisional Application No. 60/260,330, filed Jan. 8, 2001.

BACKGROUND OF THE INVENTION

1. Field of the Invention

This invention relates to clustered computer systems. More particularly, this invention relates to efficiencies in the deployment of applications on a new node of a cluster.

2. Description of the Related Art

Cluster technology now supports computer system availability, and has become indispensable to large business operations. A cluster is a collection of one or more complete systems that cooperate to provide a single, unified computing capability. Typically, the cluster members are interconnected by a data network, such as an IP network. From the perspective of the end user, the cluster operates as though it were a single system. Clusters provide redundancy, such that any single outage, whether planned or unplanned, in the cluster does not disrupt services provided to the end user. End user services can be distributed among the cluster members, and are automatically relocated from system to system within the cluster in a relatively transparent fashion by a cluster engine, in accordance with policies established by the cluster resource group management.

The process of bringing up a new node into an existing cluster is time consuming. Classically, an entire image would be installed onto the node, or at least cloned from an existing node. Disk cloning products, such as Ghost™, available from Symantec Corporation, 20330 Stevens Creek Blvd. adopts this approach. However in the dynamic environment of web server applications, this is too time consuming to be practical.

The RPM product, available from Red Hat, Inc., 2600 Meridian Parkway, Durham, N.C. 27713, reduces the complexity of application installation by packing applications with installation scripts and a list of dependencies. The RPM utility performs the dependencies check, unpacks applications, and runs the installation scripts.

Both of the above approaches assume that applications and data are installed on each machine of the cluster as independent copies. This requirement has a serious drawback, as content management then becomes difficult, requiring the maintenance of many copies of the same data to assure coherence of data.

It is possible to employ a shared file system to store applications and data in order to reduce the application priming time. Ideally, one symbolic link to a subdirectory of the shared file system would be sufficient to fully enable applications on the new node. However, this technique is effective only for applications that do not use any files located outside application-specific directories. Many applications employ files that are located in system directories, for example the directory /etc. Such applications would require multiple symbolic links, which would be cumbersome and time consuming to establish. Furthermore, symbolic links can be used only for certain types of files. They are inapplicable, for example, to directories that are created during installation, and are used only for local data. For example, the installation of the Apache web server, available from Red Hat, Inc., requires a directory /var/log/http, in which each node of the cluster is meant to keep a local log of http activity. Creating such a directory on a shared file system is problematic, since different instances of the application will overwrite its files.

SUMMARY OF THE INVENTION

It is a primary advantage of some aspects of the present invention that the speed of deployment of new nodes in a cluster, and new applications in a node is reduced, compared to disk cloning times.

It is another advantage of some aspects of the present invention that the mapping process in application deployment onto a node of a cluster can be fully automated.

It is yet another advantage of some aspects of the present invention that the efficient sharing of applications and data among members of a cluster reduces the cost of cluster management.

Because of a highly variable load placed on web servers, it is desirable to enable dynamic resource allocation between clusters for different applications and customers. It is a further advantage of some aspects of the invention that the efficiency of web hosting is improved by easing the deployment of applications onto dynamic clusters. Web hosting services are thus enabled to make better utilization of resources, and to more precisely define and implement service level agreements with their customers.

These and other advantages of the present invention are attained by a cluster application deployment model which provides an efficient methodology for the deployment of applications on a shared file system, and provides an automated mechanism for mapping the shared application image into the local file system of a new node of a cluster.

The invention provides a method for deploying a computer application on a network, which includes the steps of installing an application on a local file system of an application server, and relocating the locally installed application onto a shared file system. This is accomplished identifying files that are shareable among multiple instances of the application, relocating the shareable files from the locally installed application to the shared file system, and establishing symbolic links on the application server to the relocated files.

An aspect of the method includes identifying instance read/write files among the application files, and establishing the instance read/write files in at least one subtree of the local file system.

Another aspect of the method includes initializing a cache in the application server, and executing a configuration script after installing and relocating the locally installed application.

One aspect of the method includes associating at least one application file element with a 4-tuple, wherein a value "SharedDir" specifies a root directory in the shared file system, a value "LocalDir" specifies a first subdirectory in the local file system, a value "policy" specifies a file creation policy that applies to the local file system, and an optional value "script" is a reference to a configuration script. The value "policy" specifies a file creation policy for a subdirectory in the local file system, and creating a symbolic link in the local file system to a remote file.

According to yet another aspect of the method, the file creation policy specifies creating in the local file system a first symbolic link to a remote subdirectory and a second symbolic link to a remote file.

Still another aspect of the method includes modifying at least one of the application files of the application by executing the configuration script.

In an additional aspect of the method during relocation of the locally installed application the file creation policy may specify creating symbolic links in response to the file creation policy, or exclusive creation of subdirectories.

In still another aspect of the method the locally installed application is relocated by successively associating application file elements of the root directory with the 4-tuple.

In yet another aspect of the method relocating the locally installed application is accomplished by recursively mapping a subtree of the local file system onto the shared file system.

According to an additional aspect of the method, at least a portion of the application file elements of the root directory are substituted for the value SharedDir and the value LocalDir of the 4-tuple.

The invention provides a method for deploying a computer application on a network, which includes the steps of selecting an application server of a cluster for application priming, installing an application on a local file system of the application server according to an installation procedure of an installation management node of the cluster, and relocating the locally installed application onto a shared file system, wherein the shared file system mirrors an application directory of the installation management node. Relocation is accomplished by identifying files of the application as functionally read-only files, instance read/write files, and application read/write files, moving the functionally read-only files from the locally installed application to the shared file system, moving the application read/write files from the locally installed application to the shared file system, automatically establishing the instance read/write files in at least one subtree of the local file system, and automatically establishing symbolic links on the application server that are directed to corresponding locations of the relocated functionally read-only files and the relocated application read/write files.

According to an aspect of the method, the relocated functionally read-only files include a configuration file.

In another aspect of the method the files of the application are identified off-line.

In an additional aspect of the method selecting an application server, installing the application, and relocating the application are performed using a data management process and a daemon that executes on the application server.

In one aspect of the method the application server is a plurality of application servers that receive a multicast that is initiated by the data management process during at least one of the steps of selecting an application server, installing the application, and relocating the application.

Still another aspect of the method relocating the locally installed application also includes mapping a 4-tuple, wherein a first value SharedDir of the 4-tuple specifies a root directory in the shared file system, a second value LocalDir of the 4-tuple specifies a first subdirectory in the local file system, a third value policy of the 4-tuple specifies a file creation policy that applies to the local file system, and a fourth value script is a reference to a configuration script. a 4-tuple, wherein a value "SharedDir" specifies a root directory in the shared file system, a value "LocalDir" specifies a first subdirectory in the local file system, a value "policy" specifies a file creation policy that applies to the local file system, and an optional value "script" is a reference to a configuration script. The value "policy" specifies a file creation policy for a subdirectory in the local file system, and creating a symbolic link in the local file system to a remote file.

According to a further aspect of the method, the configuration script modifies files of the application that are located on the local file system.

The invention provides a computer software product, including a computer-readable medium in which computer program instructions are stored, wherein the instructions, when read by a computer, cause the computer to deploy an application on a network by executing the steps of installing an application on a local file system of an application server, and relocating the locally installed application onto a shared file system identifying files that are shareable among multiple instances of the application, moving the shareable files from the locally installed application to the shared file system to define relocated files, and establishing symbolic links on the application server that are directed to corresponding locations of the relocated files.

The invention provides a computer software product, including a computer-readable medium in which computer program instructions are stored, wherein the instructions, when read by a computer, cause the computer to deploy an application on a network by executing the steps of selecting an application server of a cluster for application priming, installing an application on a local file system of the application server according to an installation procedure of an installation management node of the cluster, relocating the locally installed application onto a shared file system, wherein the shared file system mirrors an application directory of the installation management node. Relocating the locally installed application is performed by identifying files of the application as functionally read-only files, instance read/write files, and application read/write files, moving the functionally read-only files from the locally installed application to the shared file system, moving the application read/write files from the locally installed application to the shared file system, automatically establishing the instance read/write files in at least one subtree of the local file system, and automatically establishing symbolic links on the application server that are directed to corresponding locations of the relocated functionally read-only files and the relocated application read/write files.

The invention provides a computer system including a computer that has computer program instructions stored therein. The instructions, when read by the computer, cause the computer to deploy an application on a network by executing the steps of installing an application on a local file system of an application server to define a locally installed application, and relocating the locally installed application onto a shared file system by the steps of identifying files of the application that are shareable among multiple instances of the application, moving the shareable files from the locally installed application to the shared file system, and establishing symbolic links on the application server that are directed to corresponding locations of the relocated files.

BRIEF DESCRIPTION OF THE DRAWINGS

For a better understanding of these and other objects of the present invention, reference is made to the detailed description of the invention, by way of example, which is to be read in conjunction with the following drawings, wherein:

FIGS. 3A and 3B, collectively referred to herein as FIG. 3, are portions a detailed flow chart of a method of mapping, which is operative in method illustrated in the flow chart of FIG. 2.

FIG. 6 is a flow chart illustrating certain aspects of the operation of the data management module shown in FIG. 5; and FIG. 7 is a state diagram of a daemon of the data management module shown in FIG. 5.

DESCRIPTION OF THE PREFERRED EMBODIMENT

Figure 1:
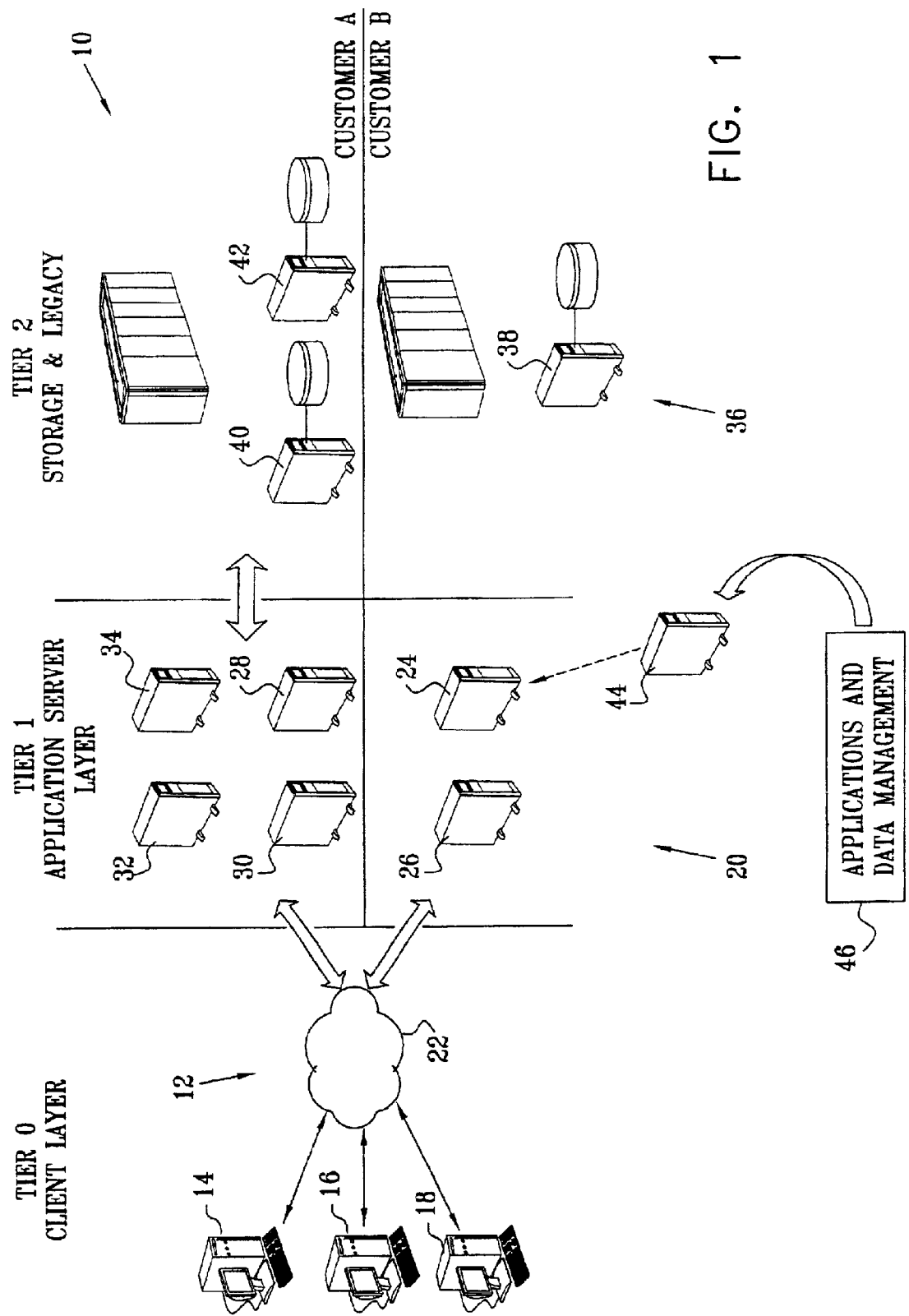
FIG. 1 is a block diagram of an application server tier that is constructed and operative in accordance with a preferred embodiment of the invention.

In the following description, numerous specific details are set forth in order to provide a thorough understanding of the present invention. It will be apparent however, to one skilled in the art that the present invention may be practiced without these specific details. In other instances well known circuits, control logic, and the details of computer program instructions for conventional algorithms and processes have not been shown in detail in order not to unnecessarily obscure the present invention.

Software programming code, which embodies aspects of the present invention, is typically maintained in permanent storage, such as a computer readable medium. In a client/server environment, such software programming code may be stored on a client or a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and distributing software code via networks are well known and will not be further discussed herein.

General Description.

The process of sharing applications among several machines by installing binaries and data on a shared file system varies in difficulty from trivial to very complex, depending on the way the application accesses its data. The teachings according to the present invention are operable with many known shared file systems, for example the IBM Transarc® Andrew File System (AFS) distributed file system, available from IBM, New Orchard Road, Armonk, N.Y. and the NFS Distributed File Service, available from Sun Microsystems, 901 San Antonio Road, Palo Alto, Calif. AFS is employed in the currently preferred embodiment of the invention.

Applications may be classified according to the difficulty of this process. Convenient categories are as follows: (1) shareable; (2) almost shareable; and (3) non-shareable.

Shareable Applications.

Applications that are location independent and do not need to modify any system files may be simply installed on a file server and run from there. Such applications are said to be "shareable".

Almost Shareable Applications.

Some applications need to modify system files during installation. Thus, these applications are not entirely location independent. For example, a web server installation, such as the version of the Apache web server that is distributed with Ver 6.2 of Linux, from Red Hat, Inc., may modify the /etc/mime.types file to add the text/html entry. Such applications are categorized as "almost shareable".

Non Shareable Applications.

Applications that require exclusive access to their data are categorized as "non shareable", even if the data is stored on a shared file system. For example, Domino databases are owned and managed by a single Domino server. Other servers share the data using replication of the databases. This approach requires cloning initialized replicas and frequent replications in order to maintain synchronization of all copies.

System Architecture.

Turning now to the drawings, reference is now made to FIG. 1, which illustrates an application server tier 10 that is constructed and operative in accordance with a preferred embodiment of the invention. In the application server tier 10 there is a client layer 12, in which a plurality of customers 14, 16, 18 are connected to an application server layer 20 via a data network 22. The data network 22 can be the Internet. The application server layer 20 comprises a plurality of application servers 24, 26, 28, 30, 32, 34, which interface with a storage layer 36. The storage layer 36 includes file servers 38, 40, 42.

In the configuration shown in FIG. 1, the application server layer 20 is partitioned such that the application servers 24, 26 are currently assigned to one of the customers 14, 16, 18, and the application servers 28, 30, 32 are assigned to another one of the customers 14, 16, 18. This assignment is dynamically and automatically reconfigurable, so that, depending on workload and other policy considerations, the application servers 24, 26, 28, 30, 32 can be reallocated to different customers at any time. The storage layer 36 is currently configured such that the file server 38 is associated with the application servers 24, 26, and the file servers 40, 42 are associated with the application servers 28, 30, 32, 34. This association is also dynamically and automatically reconfigurable in accordance with the needs of the applications executing on the application servers 24, 26, 28, 30, 32, 34 at a particular time.

Addition of a New Node to a Cluster.

In the application server tier 10, all data of the customers 14, 16, 18 is kept in a shared file system, which is preferably the above noted Andrew File System, represented as the storage layer 36. Installation and configuration of applications in the application server layer 20 is accomplished off-line. When a new node, or application server is added to the application server layer 20, application priming, that is, the process of bringing up needed applications, is reduced to mapping one or more remote shared subtrees onto the local file system of the new node.

A new node, represented as an application server 44, is shown as being brought into the application server layer 20. An applications and data management module 46 is responsible for the mapping of remote shared subtrees into the local file system of the application server 44. In the simplest case, the mapping involves only the creation of a few symbolic links, but it could be relatively complex for applications that require system configuration changes. Operation of the applications and data management module 46 may result in multicasting data to all new nodes that are simultaneously being allocated to one of the customers 14, 16, 18. When the application server 44 is configured, all application data, including executables, configuration files, and data, reside in the elements of the storage layer 36. The local disk of the application server 44 is used only for temporary data, machine specific configuration, and the basic operating system. This approach greatly reduces the time and complexity of the application priming process.

General Procedure for Application Deployment.

Figure 2:
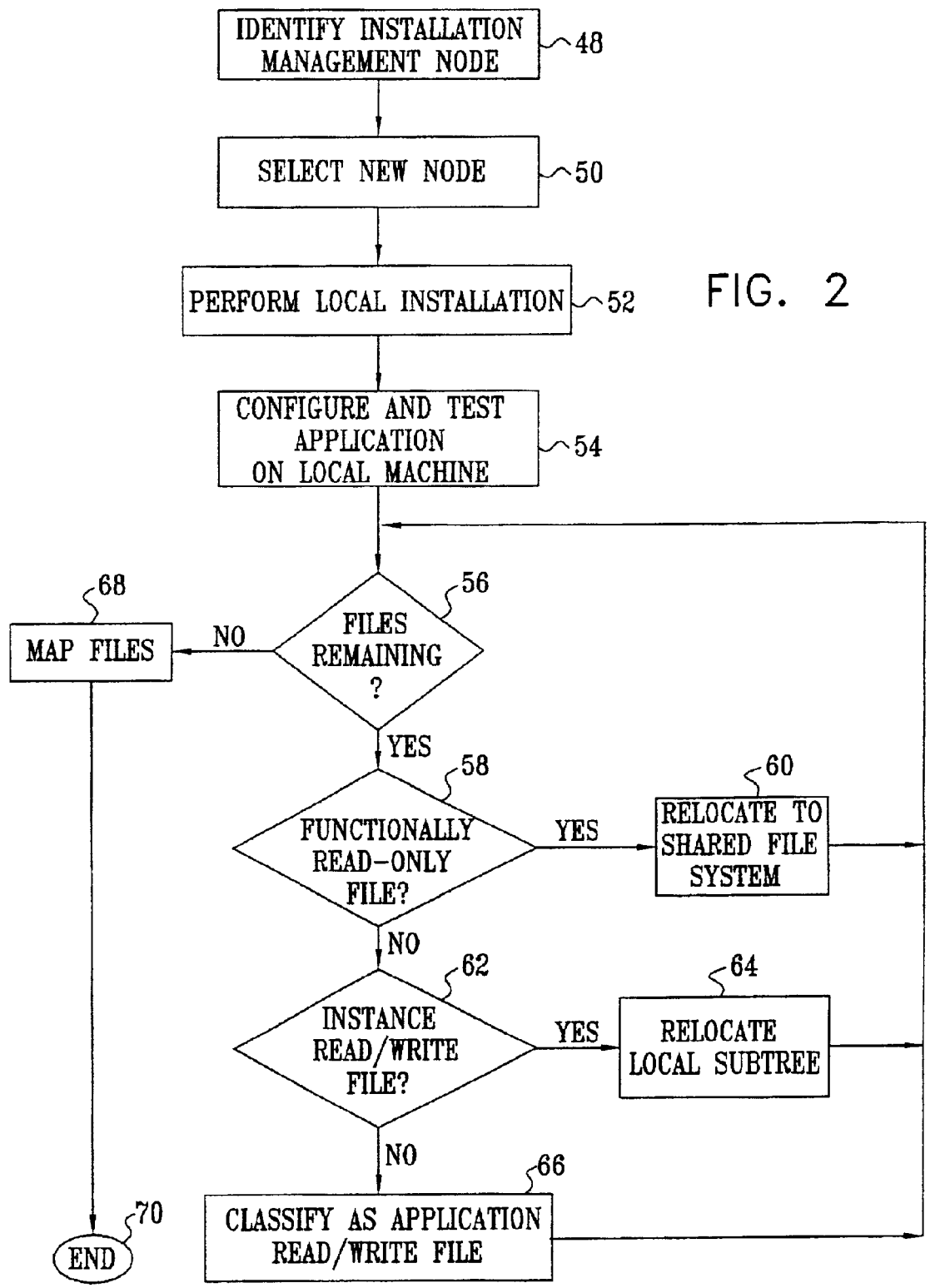
FIG. 2 is a flow chart illustrating a method of application deployment, which is operative in accordance with a preferred embodiment of the invention.

Reference is now made to FIG. 2, which is a flow chart illustrating a method of application deployment, which is operative in accordance with a preferred embodiment of the invention. To deal with the variations in applications being deployed that were disclosed above, a three-phase process is used for deployment of applications on a node of a cluster:

In phase 1 a "standard installation" is performed. Phase 1 begins at step 48. An off-line machine, designated as the installation management node, is identified. Then at step 50, a local machine, is selected as the new node. At step 52 the application is installed on the local machine that was identified in step 50, using a standard application procedure taken from the installation management node that was designated in step 48. At step 54 the newly installed application is configured and tested.

In phase 2, a process of analysis and relocation is undertaken. Once an application has been installed, configured and tested, it is relocated to an area on the shared file system that mirrors the relevant application directories of the local disk of the installation management node. This relocation process requires classification of the all of the application files according to their access, and begins at decision step 56, where it is determined if application files remain to be classified and processed.

If it is determined at decision step 56 that there are application files to be classified, then at decision step 58 a test is made to determine if an application file is a functionally read-only file. As used herein, the term "functionally read-only file" means a file that will never be written to. The term thus refers only to the application's use of the file, and not to its access rights. Thus, even though an application may have update or write permission, it never writes data into a functionally read-only file. Functionally read-only files can always be relocated to the shared file system as long as the actual path to them is kept, using symbolic links, as is explained in further detail hereinbelow. In most cases configuration files are included, since they are typically modified once or sporadically. If the file is determined to be a functionally read-only file in decision step 58, then at step 60 it is relocated to the shared file system. Control then returns to decision step 56.

If, at decision step 58, the file is determined not to be a functionally read-only file, then control proceeds to decision step 62, where it is determined if the file is an instance read/write file. Instance read/write files, which contain information relevant to a particular instance of the application, must not be shared. Log files are a good example of this type of files. If the determination at decision step 62 is affirmative, then at step 64 the file is moved from the application subtree into a local subtree by modifying the application configuration file accordingly. Control returns to decision step 56.

If, at decision step 62, the file is determined not to be a instance read/write file, then at step 66 it is classified as an application read/write file and left in place on the local machine. Application read/write files contain information relevant to all instances of the application. To avoid inconsistencies, applications may choose to lock entire files or only portions of them. The lock may be limited to the intervals of write operations or may persist during the life of the application. In the latter case, the application becomes non-shareable. Control then returns to decision step 56.

If at decision step 56 it is determined that there are no more application files remaining to be classified, then, in phase 3, the final step of the deployment of an application, mapping, occurs at step 68. It includes the automatic creation of all the symbolic links for data found in functionally read-only files, application read/write data, and the creation on the local file system of entire subtrees needed for instance read-write data. Following completion of mapping, the procedure ends at final step 70.

It should be noted that the processes of installation and analysis are the most difficult and time consuming aspects of application deployment. Preferably, they are accomplished off-line, and the knowledge thereby obtained is memorized, and reapplied to future deployments of the same application.

File System Mapping—General Description.

The mapping process automatically creates (1) symbolic links for functionally read-only and application-specific read-write data, and (2) entire subtrees, which may be required for instance read-write data. This process is driven by a configuration file, consisting of mapping 4-tuples: SharedDir, LocalDir, policy, and optionally, script. A 4-tuple is defined for each application file element, either a file or a directory, which was classified in phase 2. This is generally accomplished manually by the application analyst. As is explained in further detail hereinbelow, the 4-tuples summarize determinations that are made during the analysis, as to which directories should be mapped, which directory trees should be created, and other details. The significance of the values of the 4-tuple is as follows:

The SharedDir value specifies the remote root of the mapping, i.e., where in the shared file system the image of additions to the local file system is located.

The LocalDir value specifies a subdirectory on the local file system where the links and directories specified by the SharedDir value are to be recursively created.

The policy value specifies what to create on the local file system. The policy value may specify that only subdirectories are to be created. This is done by the process mktree, and the policy value then is "mktree". Subdirectories and symbolic links to remote files, which are not located in the local file system, may be specified by a policy value of "mkdir". Symbolic links are created by the process mkdir. Alternatively, the policy value may specify the creation of symbolic links to remote subdirectories and remote files. This is accomplished by the process mklink, and the policy value is "mklink".

The script value is an optional element, which points to a configuration script. After the line in the configuration file is processed, the configuration script is called. In the preferred embodiments, the configuration script is also a pre-unmapping script, which is used to reverse the mapping process when removing an application. The script insures that residues of the previous installation, possibly including sensitive information, are not left on local drives.

The configuration script could also be called as a post-mapping configuration script when operating in environments that lack ideal installation packages. For example, applications may modify system files, application files, and create temporary files in a temporary directory, e.g. /tmp in the UNIX environment. Execution of such a post-mapping configuration script cleans up such traces of the installation process.

The various policies that can be specified in the policy value of the 4-tuple, together with the post-mapping script, allow for a great deal of flexibility, with minimal changes to the local file system. Essentially the file system mapping process results in the creation of an image of the remote file system structure on the local file system, using symbolic links as the preferred mechanism, and resorting to the creation of subtrees only when symbolic links are inappropriate. Upon completion of the file system mapping process, a minimal number of new subdirectories will have been created, while most of the data will be generally accessible using symbolic links. The special cases of files that need to be modified instead of replaced are handled by the configuration script.

File System Mapping—Detailed Procedure.

Reference is now made to FIG. 3, which is a flow chart presenting the mapping procedure of step 68 (FIG. 2) in further detail. The description of FIG. 3 should be read in conjunction with FIG. 2, and with the pseudocode fragment shown in Listing 1. Listing 1 is a high level description of the file system mapping procedure used in the preferred embodiment of the invention.

In initial step 72 a set of subtrees, SubTreesToMake, is initialized to the empty set. The subtrees to be created on the local computer are maintained in this set of subtrees as the mapping procedure proceeds, and controls the flow of the mapping procedure, as is disclosed in further detail hereinbelow. Next, all the 4-tuples pertaining to the application being deployed are processed in turn. For a current 4-tuple, at decision step 74 a test is made to determine whether the policy value of the 4-tuple is mklink. If the determination is affirmative, then a symbolic link to the application file element is created in step 76, provided that the link does not already exist on the local computer. Control is then transferred to decision step 78.

Otherwise, at decision step 80 a test is made to determine whether a directory LocalDir exists on the local machine. If the determination at decision step 80 is affirmative, then control proceeds to decision step 82.

If the determination at decision step 80 is negative, then control proceeds to step 84, where directory LocalDir is created. The directory LocalDir is specific to the file or directory associated with the current 4-tuple.

Execution then proceeds to decision step 82, where a test is made to determine whether the policy value of the 4-tuple is mktree. If the determination is affirmative, then the directory LocalDir is added to the set SubTreesToMake in step 86. Control then is transferred to decision step 78. Otherwise control proceeds directly to decision step 78.

At decision step 78 a test is made to determine if there are more 4-tuples to process. If so, then control returns to decision step 74.

If at decision step 78 it is determined that there are no more 4-tuples to process then the 4-tuples are re-evaluated in turn with respect to the SharedDir value of each 4-tuple. At decision step 88 it is determined if the SharedDir value of a current 4-tuple is "–". If the determination at decision step 88 is affirmative, then control proceeds to step 90

At step 90 the directory specified in the LocalDir value of the current 4-tuple is flagged with a policy marker according to the policy value of the current 4-tuple. Control then proceeds to directly to decision step 92 (FIG. 3B), which will be discussed below.

If the determination at decision step 88 is negative, then control proceeds to decision step 94, where it is determined if the directory specified in the LocalDir value of the current 4-tuple is in the set SubTreesToMake. If the determination in decision step 94 is affirmative, then at step 96 the policy value of the current 4-tuple is set to mktree. Otherwise control proceeds directly to step 98.

At step 98 a variable sdir is assigned the SharedDir value in the current 4-tuple. The variable sdir now specifies the name of a directory on the shared file system.

Next, at step 100, a variable ldir is assigned the LocalDir value of the current 4-tuple. The variable ldir now specifies the name of a directory on the local machine. Control now passes to decision step 102.

At decision step 102 a determination is made whether the directory specified by the variable ldir is flagged with a policy marker.

If the determination at decision step 102 is negative, then control proceeds to step 104.

If the determination at decision step 102 is affirmative, then control proceeds to step 106, where the value of the policy marker identified in decision step 102 is assigned to the policy value of the current 4-tuple. Control proceeds to step 104.

The directory entries of the shared file system directory specified by the variable sdir are now evaluated and processed at step 104.

Figure 3B:
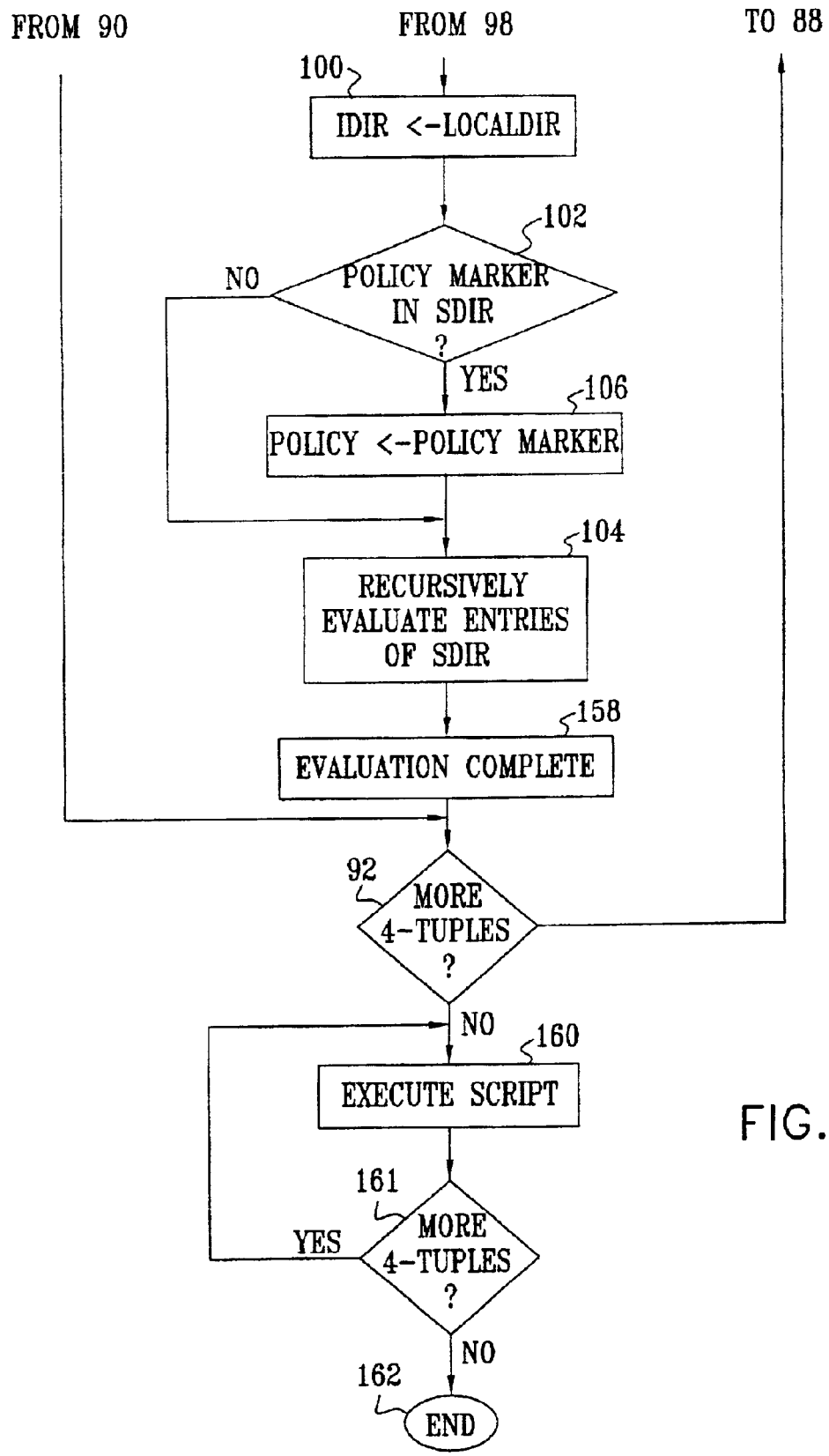
Figures 4, 4A:
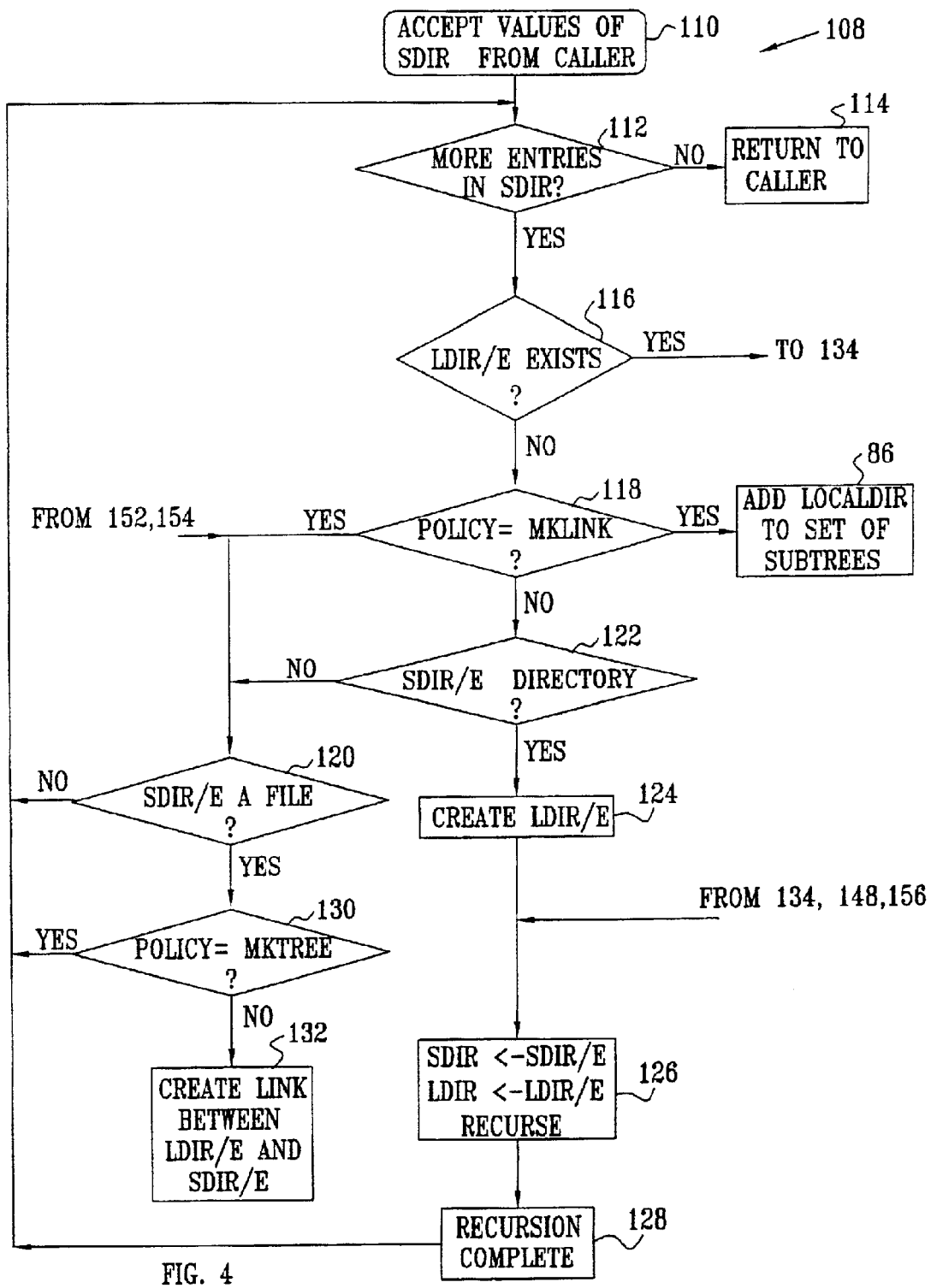
FIGS. 4A–4C, collectively referred to herein as FIG. 4, are portions of a flow chart of a recursive procedure for the analysis of application files and directories which is operative in the mapping method illustrated in the flow chart of FIG. 3.

Reference is now made to FIG. 4, which is a detailed flow chart of step 104. FIG. 4 illustrates a recursive procedure 108 that is operative in accordance with a preferred embodiment of the invention. The description of FIG. 4 should be read in conjunction with FIG. 3. Instances of the procedure 108 execute using local values of the variables sdir and ldir. Preferably, the variables sdir and ldir are passed to the instances as parameters. At initial step 110 control is accepted from a caller of the procedure 108, The procedure 108 is first called during the performance of step 104 (FIG. 3), utilizing the values of the variables sdir and ldir that were set in step 98 and step 100. Control proceeds to decision step 112, where it is determined if there remain directory entries to be processed. If the determination at decision step 112 is negative, then control returns to the caller of the procedure 108 at final step 114

If the determination at decision step 112 is affirmative, then control proceeds to decision step 116 where it is determined if an entry ldir/e exists on the local file system. The entry ldir/e on the local file system directory corresponds to an entry sdir/e in the shared file system directory.

If the determination at decision step 116 is negative, then control proceeds to decision step 118, where it is determined if the policy value of the current 4-tuple is mklink. If the determination at decision step 118 is affirmative, then control proceeds to decision step 120.

If the policy value of the current 4-tuple is determined not to be mklink at decision step 118, then control proceeds to decision step 122. At decision step 122 it is determined if the current entry in the shared file system directory is a directory. If the determination at decision step 122 is negative, then control proceeds to decision step 120.

If the determination at decision step 122 is affirmative, then control proceeds to step 124 where a new directory is created on the local file system. The new directory, designated ldir/e, corresponds to the current entry on the shared file system directory, sdir/e. Thus, in step 124 a portion of an image of a shared file system directory is formed on the local file system.

Then at step 126 preparations are made to repeat the procedure 108 recursively. The value of the entry ldir/e is assigned to the variable ldir, and the value of the entry sdir/e is assigned to the variable sdir in preparation for recursion. Control then transfers to initial step 110. When control eventually returns via final step 114, control then passes to decision step 112 at step 128.

In the event that the determination at decision step 118 was affirmative, or the determination at decision step 122 was negative, then execution continues at decision step 120. At decision step 120 it is determined whether the entry sdir/e is a file. If the determination at decision step 120 is negative, then control returns to decision step 112.

If the determination at decision step 120 is affirmative, then control proceeds to decision step 130, where it is determined if the policy value in the current 4-tuple is mktree. If the determination at decision step 130 is affirmative, then control returns to decision step 112.

If the determination at decision step 130 is negative, then control proceeds to step 132, where a link is created between the entries ldir/e and sdir/e. Control then returns to decision step 112.

Figure 4B:
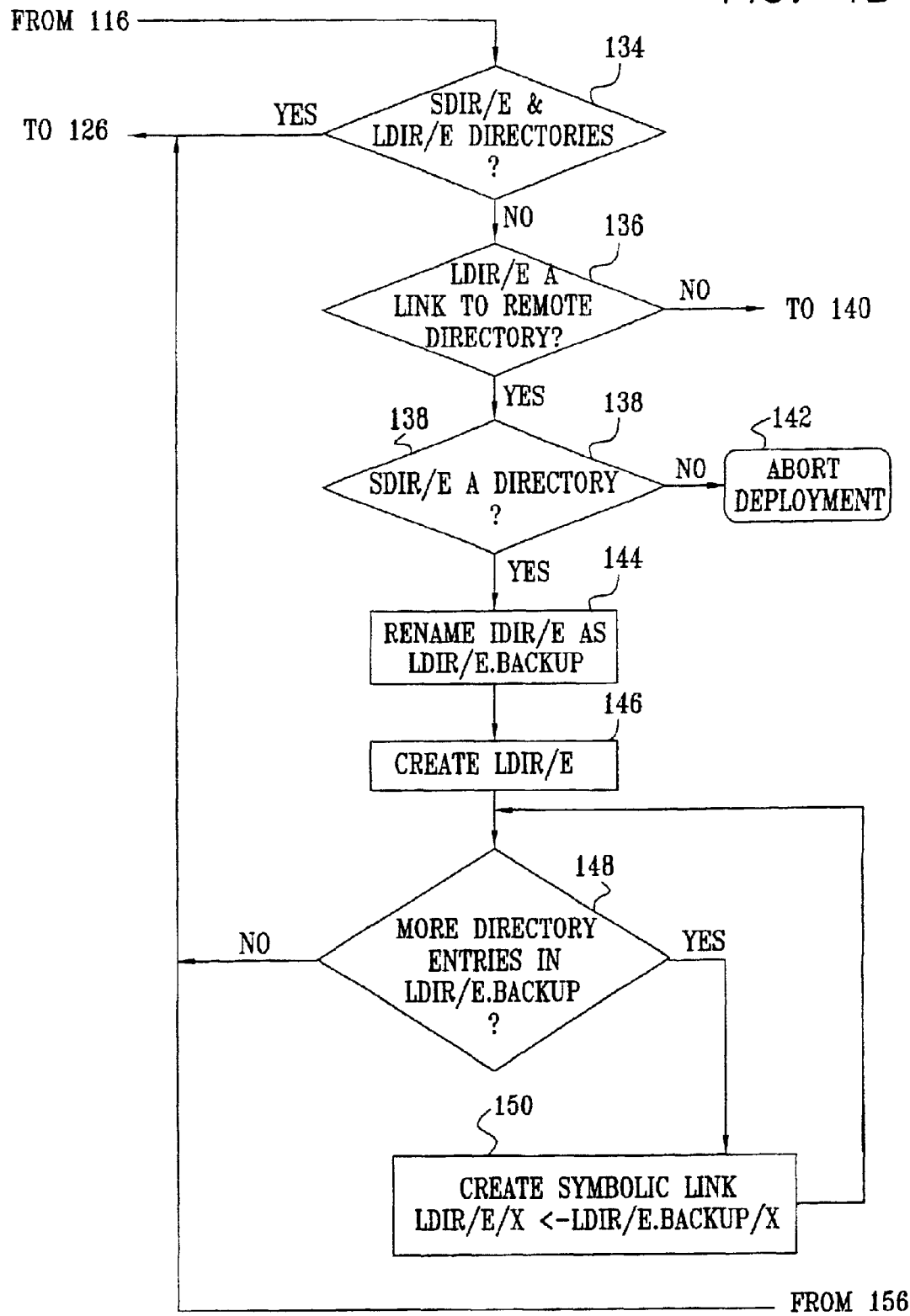

If at decision step 116, it was determined that the entry ldir/e exists then control proceeds to decision step 134 (FIG. 4B), where it is determined if both the entries ldir/e and sdir/e are directories. If the determination at decision step 134 is affirmative, then the procedure 108 will be called recursively by transferring control to step 126 (FIG. 4A).

Figure 4C:
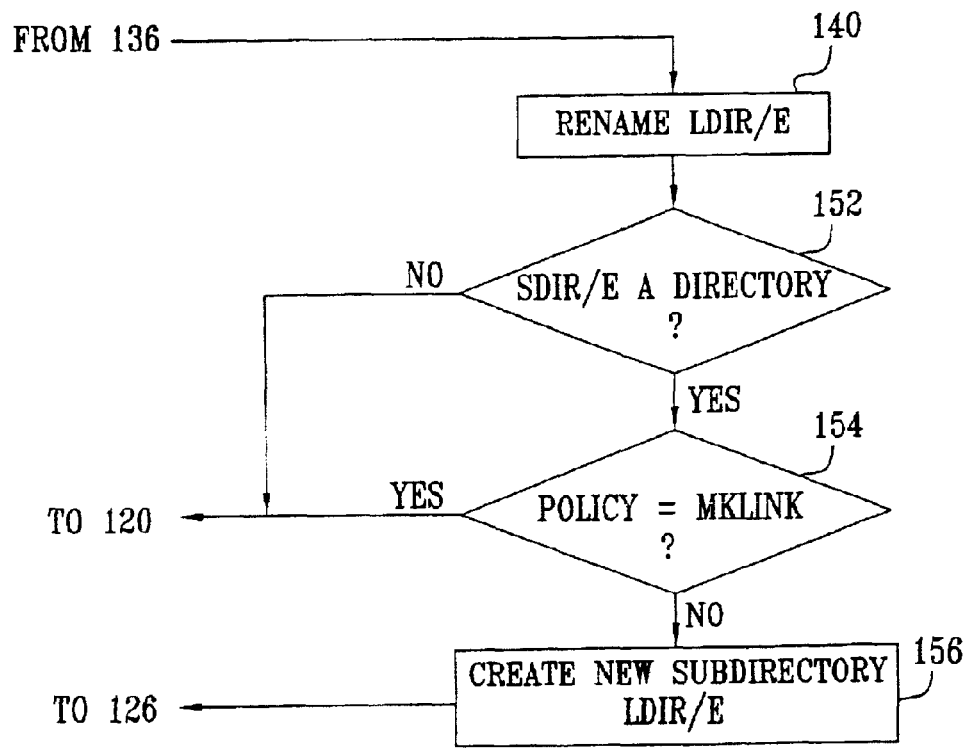

If the determination at decision step 134 is negative, then control proceeds to decision step 136, where it is determined if the entry ldir/e is a symbolic link to a remote directory. If the determination at decision step 136 is affirmative, then control proceeds to decision step 138. Otherwise control proceeds to step 140 (FIG. 4C).

At decision step 138 it is determined if the entry sdir/e is a directory. If it is not, then an inconsistency in the configuration file of the application has been detected. The deployment of the application is aborted at final step 142.

If at decision step 138 it is determined that the entry sdir/e is a directory, then at step 144 the entry ldir/e is renamed. A renaming convention is preferably used in order to insure that the backup entries are uniquely identified. This is required due to the fact that different applications may refer to the same file. For purposes of this discussion, the renamed entry is simply referred to as ldir/e.backup/x.

Next, at step 146 a new directory ldir/e is created on the local file system, and symbolic links are created for each of the directory entries of the remote directory pointed to by the renamed entry ldir/e.backup/x.

Control now proceeds to decision step 148 where it is determined if entries remain to be processed. If the determination at decision step 148 is negative, then control returns to step 126 (FIG. 4A).

If the determination at decision step 148 is affirmative, then control proceeds to step 150, where a symbolic link, ldir/e/x is created on the local file system pointing to the remote directory pointed by the current directory entry ldir/e.backup/x. Control then returns to decision step 148.

Control continues at step 140 (FIG. 4C) if the determination at decision step 136 is negative. At this point, it has been established that the entry ldir/e is neither a directory nor a symbolic link to a remote directory. Now the entry ldir/e is renamed on the local file system, using a renaming convention, as has been disclosed above in the discussion of step 144.

Next, at decision step 152 it is determined if the entry sdir/e is a directory. If the determination at decision step 152 is negative, then control proceeds to decision step 120 (FIG. 4A).

If the determination at decision step 152 is affirmative, then control proceeds to decision step 154, where it is determined whether the policy value of the current 4-tuple is mklink. If the determination at decision step 154 is negative, then control proceeds to step 156. Otherwise control proceeds to decision step 120 (FIG. 4A).

At step 156 a new subdirectory is created, which has the name of the entry ldir/e that was created in step 124. Control then returns to step 126(FIG. 4A).

Reference is again made to FIG. 3. Upon completion of the recursive procedure 108, control returns via final step 114 (FIG. 4A) to step 158 (FIG. 3B). Control proceeds to decision step 92, where it is determined if more 4-tuples remain to be processed. If the determination at decision step 92 is affirmative, then control returns to decision step 88 (FIG. 3A).

If the determination at decision step 92 is negative, then the deployment of the application is completed by execution of the configuration script that is designated in the script value of each 4-tuple. Counters are reset, and execution continues at step 160, where the configuration script named in the current 4-tuple is optionally executed.

Control proceeds to decision step 161, where it is determined if there are 4-tuples to be processed. If the determination at decision step 92 is affirmative, then control returns to step 160.

If the determination at decision step 161 is negative, then control proceeds to final step 162, which completes the deployment of the application.

Listing 1

1. SubTreesToMake <- { }
2. For each 4-tuple <SharedDir, LocalDlr, policy, script> in the configuration file where policy not equals mklink
    a. If LocalDir does not exists create it.
    b. If policy equals mktree then
       SubTreesToMake <- (SubTreesToMake U LocalDir)
    c. If SharedDir is "–" then mark the LocalDir with a policy-marker according to policy
3. For each 4-tuple <SharedDir, LocalDlr, policy, script> in the configuration file where SharedDir not equals "–"
    a. if LocalDir is in SubTreesToMake then policy <- mktree
    b. sdir <- SharedDir
    c. ldir <- LocalDir
    d. If ldir is marked with a policy-marker then policy<–policy marker
    e. for each directory entry e in the directory sdir
       i. if ldir/e does not exist then:
          1. if sdir/e is a directory and policy is not mklink then:
             a. create subdirectory ldir/e
             b. ldir <- ldir/e
             c. sdir <- sdir/e
             d. go back to step 3.d
          2. else if sdir/e is a file and policy is not mktree then create link ldir/e ->sdir/e.
       ii. else (ldir/e exists):
          1. if ldir/e is a directory and sdir/e is also a directory then:
             a. ldir <- ldlr/e
             b. sdir <- sdir/e
             c. go back to step 3.d
          2. else if ldir/e is a symbolic link to a remote directory then:
             a. if sdir/e is also a directory then:
                i. rename ldir/e (say to ldir/e.backup)
                ii. create directory ldir/e
                iii. for each directory entry x in remote directory pointed to by ldir/e.backup
                   1. create symbolic link ldir/e/x ->ldir/e.backup/x
                iv. ldir <- ldir/e
                v. sdir <- sdir/e vi. go back to step 3.d
b. else (sdir/e is not a directory):
ix. Inconsistency in the configuration file; abort execution
3. else (ldir/e is not a directory nor a link to a remote directory):
a. rename ldir/e
b. if sdir/e is a directory and policy is not mklink then:
i. create subdirectory ldir/e
ii. ldir <- ldir/e
iii. sdir <- sdir/e
iv. go back to step 3.d
c. else if sdir/e is a file and policy is not mktree then create link ldir/e ->sdir/e
4. for each 4-tuple <SharedDir, Localdir, policy, script> in the configuration file
a. execute script Data Management Overview.

Figure 5:
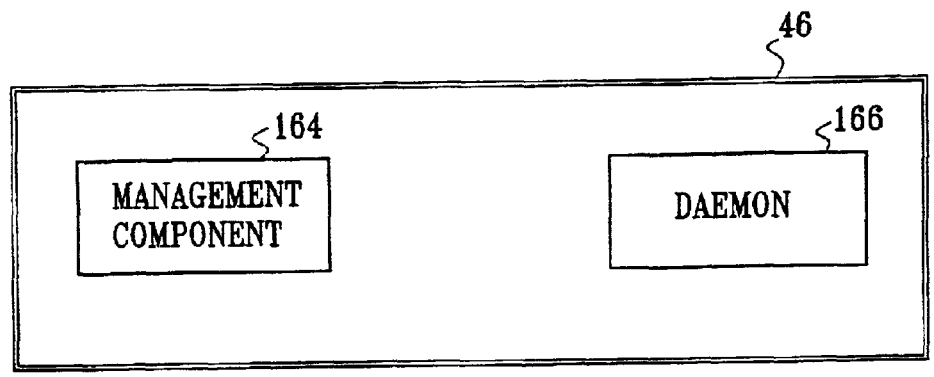
FIG. 5 is a block diagram of an applications and data management module which is used in the arrangement shown in FIG. 1.

Reference is now made to FIG. 5, which is a more detailed block diagram of the applications and data management module 46 (FIG. 1). The applications and data management module 46 includes a management component 164, which oversees and coordinates the application priming process. The applications and data management module 46 further includes a daemon 166. The daemon 166 executes on all nodes, and is responsible switching run-levels, receiving new configurations and exchanging messages with the controlling entity. File system mapping and cache pre-fetching are accomplished using a set of specially adapted UNIX System V initialization scripts (init scripts).

Operation of the init scripts can be understood with reference to the following disclosure. For every run-level there is a subdirectory in the directory /etc/rc.d. For example, init scripts for run-level 3 typically are found in the subdirectory /etc/rc.d/rc3.d. Init scripts for the specially created run-level 7 are found in the subdirectory /etc/rc.d/rc7.d.

The subdirectory /etc/rc.d/rc7.d. contains a set of shell scripts, which employ a special naming convention: The file names are "S##name" or "K##name", where letter "S" signifies "start", and the letter "K" signifies "kill". The symbols "##" represent a 2-digit number, which determines the order of execution of the scripts in the set. The string "name" is the name of the service that the script controls.

A particular script in the set, S00single, is responsible for switching the operating system's kernel from a multi-user mode to a single-user mode (maintenance mode). In this mode, it is possible to extensively reconfigure the AFS, which cannot be feasibly accomplished in the multi-user mode.

In the preferred embodiment, run-level 7 has a special version of the script S00single, which runs a setup script. The setup script accomplishes the actual mapping and cache initialization. When the script has exited, the system is switched back to run-level 3, which restarts the services for that run-level. The daemon 166 then reports on the success or failure of the deployment to the controlling entity.

It should be again noted that the daemon 166 runs on all the application servers, even those in which the application has already been installed. It is also responsible for sending a replica of the cache to joining servers.

Reference is now made to FIG. 6, which is a flow chart illustrating certain activities of the management component 164 (FIG. 5). These activities of the management component 164 create a compliant environment for executing the methods of the present invention in order to deploy or allocate nodes on a cluster, and to efficiently instantiate applications on nodes of a cluster.

In initial step 168 a requirement to begin application priming is recognized. Typical priming instructions consist of a customer identifier, a list of nodes, and a command. The management component 164 may be commanded to allocate more nodes to one of the customers 14, 16, 18, remove nodes from the one of the customers 14, 16, 18, or to restore one of the customers 14, 16, 18 to an unallocated state. In the case where new nodes are to be allocated, the management component 164 initializes the application priming process on the new nodes.

At step 170, a cache pre-fetch source is selected from nodes which are already allocated. The management component 164 sends an INITIALIZE-CACHE request to the selected node. Control proceeds to a delay step 172, during which the management component 164 waits until the cache pre-fetch source is ready. Then, at step 174, the management component 164 sends a START-PRIMING message to all new nodes which are to be allocated to the particular one of the customers 14, 16, 18.

The management component 164 then delays at delay step 176 until the last new node being allocated has responded with a PRIMING-COMPLETED message. The management component 164 now delays at delay step 178 until an instruction is received from the higher level supervisory element (not shown) to deallocate one or more nodes. Thereupon the management component 164 issues a START-CLEANING message at step 180, and waits at delay step 182 until a CLEANING-COMPLETED message has been received from each node being deallocated. The application priming procedure then terminates at final step 184.

It will be understood that the management component 164 in practice may be realized as a multiplicity of processes or threads executing in parallel, and while delay steps are shown for clarity, the management component 164 is able to concurrently respond to other operational requirements.

Reference is now made to FIG. 7, which is a state diagram of the daemon 166, an instance of which is executing in each new node intended to be allocated. The description of FIG. 7 should be read in conjunction with FIG. 5 and FIG. 6. Initially, the system is operating at run-level 3, and the daemon 166 is in a free state 186, where it is awaiting the START-PRIMING message, which is sent at step 174 (FIG. 6).

When the START-PRIMING message is received, the daemon 166 responds by changing the system run-level to a special level, run-level 7, and transiting from the free state 186 to a priming state 188. Upon entering run-level 7 a number of priming events occur. All services are stopped. The AFS client component is stopped for a first time. The AFS client component executes on the application server, and has access to the AFS shared file system. Stopping the AFS client component is necessary, because various services are linked to the AFS, and would not shutdown properly if remote files are open. The daemon 166 is also stopped, and the AFS client component can now be reconfigured in various respects, for example changing AFS cells, and changing cache sizes.

While remaining in run-level 7, the AFS client component is restarted. Mapping then takes place. It should be noted that mapping involves accessing directories on the shared file system, which may affect the status of the AFS cache. During mapping the AFS cache must function as the cache of a running server in the cluster.

While continuing to operate in run-level 7, the run-level 7 init scripts create symbolic links to the shared file system on the customer's AFS cell as required by the node, and initializes the system cache. This is described more fully hereinbelow in the disclosure of mapping.

Following completion of the mapping process, the AFS client cache must be preloaded from an existing application server. This is done in order to reduce the load on the AFS Server when multiple application servers are being added simultaneously. It is assumed that an existing application operating under normal to high loads will contain the most needed data in its cache. However, because the AFS client component is currently running and using its cache, it is necessary to disable it a second time so that altering the AFS client cache does not interfere with the AFS client.

The AFS client cache is then preloaded. Next, the system is returned to run-level 3, using run-level 3 init scripts. These init scripts restart the AFS client component and the daemon 166. The daemon 166 thereupon automatically sends a PRIMING-COMPLETED notification message to the management component.

Upon receipt of a START-CLEANING message from the management component 164 in step 180 (FIG. 6), the daemon 166 changes the system run-level to run-level 7, and transits to a cleaning state 192. In the cleaning state 192 all services are stopped, and the shared file system cache cleaned up. All files that were created by the deployed application subsequent to priming of the node are removed, together with all symbolic links and directories that were created by the run-level 7 init scripts when the node was primed. Other routine administrative tasks, relating to the shared file system are also performed. These include stopping the AFS client component, copying administrative configuration files, and reconfiguring files and directories on the AFS administrative cell. Finally a CLEANING-COMPLETED message is transmitted to the management component 164, which awaits the message in delay step 182 (FIG. 6). The daemon 166 now returns to the free state 186, resetting the system run-level to run-level 3, restarting basic services and the AFS client component.

It is recommended to encapsulate the transitions of the daemon 166 by a conventional Unix System V init startup script.

EXAMPLE 1

Example 1 illustrates an installation of the above noted Apache Web Server using the technique outlined in Listing 1. The configuration file is shown in Listing 2. The directory structure on the volume /remote/filesystem1/Apache is shown in Listing 3.

Listing 2

\# My Apache Site
/ /remote/filesysteml /Apache/ mklink
/remote/serverl/Apache/addMimeTypes.sh
/home/httpd /remote/filesystem2/WebPages/ mklink
/var-mktree Listing 3

/etc
/etc/httpd/
/etc/httpd/conf
/etc/logrotate.d
/home
/home/httpd/cgi-bin
/home/httpd/html
/home/httpd/icons
/usr
/usr/bin
/usr/lib
/usr/lib/apache
/usr/man
/usr/man/man1
/usr/man/man8
/usr/sbin
/var
/var/cache/httpd
/van/log
/van/log/httpd The mapping algorithm will first mark the directory /var as a mktree directory. The significance of this designation is that any directories on the remote file systems that map to the directory /var will be created. There is no linking between such mapped directories to the remote file system.

Next, the algorithm will walk over the remote file system /remote/filesysteml/Apache and create the necessary directories and links. Assuming apache is not installed on the local machine, the following directories, shown in Listing 4, will be created with no links in them:

Listing 4

/var/cache
/var/cache/httpd
/var/log
/var/log/httpd

Several links to directories will be created as shown in Listing 5. It should be noted that the directories /etc, /home, /usr, /usr/bin, /usr/sbin, /usr/lib, usr/man, /usr/man/manl and /usr/man/man8 already exist on the local machine.

Listing 5

/etc/httpd -> /remote/filesystem1/Apache/etc/httpd
/etc/logrotate.d ->
   /remote/filesystem1/Apache/etc/logrotate.d
/home/httpd -> /remote/filesystem1/Apache/home/httpd
/usr/lib/apache ->
   /remote/filesystem1/Apache/usr/lib/apache Some links to files will be created in the directories that already exist on the machine. For example, in directory /usr/bin the links shown in Listing 6 will be created:

Listing 6

/usr/bin/dbmanage
/usr/bin/htdigest
/usr/bin/htpasswd

The final step of the Apache installation phase of the setup will run the addMimeTypes.sh script to add the text/html mimetype to the file /etc/mimetypes.

The next phase of the setup will be the mapping of the web pages. For simplification, it is assumed that the web site contains only static web pages. Therefore all the web pages should reside in the directory /home/httpd/html. However, a link has already been created from the directory /home/httpd to the directory /remote/filesysteml/Apache/home/httpd, where modifications are not desired. To deal with this, the procedure follows step (3)(e)(ii)(2)(a) (Listing 1), which converts a link into a local directory having links to the files in the remote directory. In this example the following link will be removed: /home/httpd ->/remote/filesystem1/ Apache/home/httpd.

The following directory will be created: /home/httpd. The links shown in Listing 7 will be created.

Listing 7

```
/home/httpd/cgi-bin ->
    /remote/filesystem1/Apache/home/httpd/cgi-bin
/home/httpd/html ->
    /remote/filesystem1/Apache/home/httpd/html
/home/httpd/icons ->
    /remote/filesystem1/Apache/home/httpd/cgi-bin/icons
```

In order to create the correct links to the file /remote/filesystem2/WebPages, the setup algorithm will once again traverse through step (3)(e)(ii)(2)(a) (Listing 1), on the link from the directory /home/httpd/html to the directory /remote/filesystem1/Apache/home/httpd/html.

Thus, the following link will be removed:

```
/home/httpd/html ->
    /remote/filesystem1/Apache/home/httpd/html,
```

The following local directory will be created: /home/httpd/html. For simplification, it is assumed that the directory /remote/filesystem1/Apache/home/httpd/html is empty.

Finally, the mapping process will map all the files from the directory /remote/filesystem2/WebPages/html to the directory /home/httpd/html.

EXAMPLE 2

Example 2 involves the installation of some Perl CGIs along with the Apache Web Server. The configuration file is shown in Listing 8.

Listing 8

```
# My CGI Enhanced Apache Site
/ /remote/filesystem1/Apache/ mklink
    /remote/filesystem1/Apache/addMimeTypes.sh
/home/httpd /remute/filesystem2/Webpages/ mklink
/var - mktree
/home/httpd /remote/filesystem3/PerlCGIs/ mklink
    /remote/filesystem3/PerlCGIs/reconfigureApache.sh
```

This example enhances Example 1 by adding PerlCGI files, which install in the directory /home/httpd/cgi-bin, and update the Apache config files to include support for PerlCGIs.

In Example 1, the directory /home/httpd/html was created because of the second entry in the configuration file (Listing 2). In this example, the link /home/httpd/cgi-bin will be removed, and instead all the files and directories in the directory /remote/filesystem1/Apache/home/httpd/cgi-bin will be linked to from the a newly created directory /home/httpd/cgi-bin. Then, all the files from the directory /remote/filesystem3/PerlCGIs/cgi-bin will be linked to the directory /home/httpd/cgi-bin, as is explained above generally with reference to FIG. 4, and more particularly, the steps beginning with step 140 (FIG. 4C).

Example 3 involves the installation of a proxy server. The configuration file is shown in Listing 9.

Listing 9

My proxy server
/ /remote/filesystem4/Proxy/ mklink
/home/proxy/cache
/remote/filesystem4/Proxy/home/proxy/cache mktree In this example, it is assumed that the proxy server uses a strict structure for its cache. That is, the proxy server expects its cache directory structure to have the structure shown in Listing 10, wherein every entry is itself a directory, which may contain other directories having a similar appearance.

Listing 10

/home/proxy/cache/0
/home/proxy/cache/1
. . .
/home/proxy/cache/100

In this example, the configuration file has been arranged to include a policy value mktree, which causes the replication of the directory structure found on the directory
/remote/filesystem4/Proxy/home/proxy/cache on the local machine. Assuming that the above directory structure already exists on the remote file system, the entire directory tree will be created locally, as it is expected by the proxy server.

Even though the tree beginning from the root directory "/" is set with the policy value mklink, i.e., creation of a link at as high a level as possible in the directory structure, the policy may change along the way, to the above noted policy value mktree.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art which would occur to persons skilled in the art upon reading the foregoing description.

What is claimed is:

1. A method for deploying a computer application on a network for execution by at least one of a plurality of machines that are connected to said network by at least one of a, comprising the steps of:

installing an application on a local file system of exactly one of said machines;

identifying functionally read only files and read-write files of said application;

moving said functionally read only files from said local file system of said one machine to a server of a shared file system that is accessible to said machine via said network to define relocated files;

copying said read-write files to local file systems of remaining others of said machines; and establishing symbolic links on said relocated files, on said machine.

2. The method according to claim 1, wherein said step of relocating said locally installed application further comprises the steps of:

identifying instance read/write files of said application; and establishing said instance read/write files in at least one subtree of said local file systems.

3. The method according to claim 1, further comprising the steps of:

initializing a cache in said server; and executing a configuration script following performance of said steps of installing an application.

4. A method for deploying a computer application on a network, comprising the steps of:
  installing an application on a local file system of a server to define a locally installed application; and
  relocating said locally installed application onto a shared file system by the steps of:
  identifying shareable files among files of said application, said sharable files being shareable among multiple instances of said application;
  moving said shareable files from said locally installed application to said shared file system to define relocated files; and
  establishing symbolic links on said server that are directed to corresponding locations of said relocated files;
  wherein said step of relocating said locally installed application further comprises associating at least one application file element with a 4-tuple, wherein:
  a first value of said 4-tuple specifies a root directory in said shared file system;
  a second value of said 4-tuple specifies a first subdirectory in said local file system;
  a third value of said 4-tuple specifies a file creation policy that applies to said local file system; and
  a fourth value is a reference to a configuration script.

5. The method according to claim 4, wherein said third value specifies a step of creating said first subdirectory in said local file system.

6. The method according to claim 4, wherein said file creation policy specifies a step of creating a first symbolic link in said local file system to a remote file.

7. The method according to claim 4, wherein said file creation policy specifies creating in said local file system a first symbolic link to a remote subdirectory and a second symbolic link to a remote file.

8. The method according to claim 4, further comprising the step of modifying at least one of said files of said application by executing said configuration script.

9. The method according to claim 4, wherein said step of relocating said locally installed application is performed by:
in a first event that said file creation policy specifies the step of creating one of said symbolic links.

10. The method according to claim 4, wherein said step of relocating said locally installed application further comprises the step of: in a second event that said file creation policy specifies an exclusive creation of subdirectories, creating said first subdirectory in said local file system.

11. The method according to claim 10, wherein said step of creating said first subdirectory comprises adding said first subdirectory to a set of subdirectories to be created.

12. The method according to claim 4, wherein said application file element comprises said root directory.

13. The method according to claim 12, wherein said step of relocating said locally installed application is performed by successively associating application file elements of said root directory with said 4-tuple.

14. The method according to claim 13, wherein said step of relocating said locally installed application is performed by recursively mapping a subtree of said local file system onto said shared file system.

15. The method according to claim 13, wherein at least a portion of said application file elements of said root directory are substituted for said first value and said second value of said 4-tuple.

16. The method according to claim 4, further comprising the step of executing said configuration script.

17. The method according to claim 4, wherein said step of relocating said locally installed application is performed by:
  in a first event that said file creation policy specifies creation of said symbolic links, creating one of said symbolic links; and
  in a second event that said file creation policy specifies exclusive creation of subdirectories, creating said first subdirectory in said local file system.

18. The method according to claim 17, wherein said step of creating said subdirectory comprises adding said first subdirectory to a set of subdirectories to be created.

19. The method according to claim 17, wherein said application file element comprises said root directory.

20. The method according to claim 19, wherein said step of relocating said locally installed application is performed by successively associating application file elements of said root directory with said 4-tuple.

21. The method according to claim 20, wherein said step of relocating said locally installed application is performed by recursively mapping a subtree of said local file system onto said shared file system.

22. The method according to claim 20, wherein at least a portion of said application file elements of said root directory are substituted for said first value and said second value of said 4-tuple.

23. A computer software product, comprising a computer-readable medium in which computer program instructions are stored, wherein said instructions, when read by a computer, cause the computer to deploy an application on a network for execution by at least one of a plurality of machines that are connected to said network, by executing the steps of:
  installing an application on a local file system of exactly one of said machines;
  identifying functionally read only files and read-write files of said application;
  moving said functionally read only files from said local file system of said one machine to a server of a shared file system that is accessible to said machine via said network to define relocated files;
  copying said read-write files to local file systems of remaining others of said machines; and
  establishing symbolic links on said relocated files, on said machine.

24. The computer software product according to claim 23, wherein said computer is further instructed to perform the steps of:
  identifying instance read/write files of said application; and
  establishing said instance read/write files in at least one subtree of said local file systems.

25. The computer software product according to claim 23, wherein said computer is further instructed to perform the step of executing a configuration script following performance of said step of installing an application.

26. A computer software product, comprising a computer-readable medium in which computer program instructions are stored, wherein said instructions, when read by a computer, cause the computer to deploy an application on a network by executing the steps of:
  installing an application on a local file system of a server to define a locally installed application; and
  relocating said locally installed application onto a shared file system by the steps of:
  identifying shareable files among files of said application, said sharable files being shareable among multiple instances of said application;

moving said shareable files from said locally installed application to said shared file system to define relocated files; and establishing symbolic links on said server that are directed to corresponding locations of said relocated files;

wherein said step of relocating said locally installed application further comprises associating at least one application file element with a 4-tuple, wherein:

a first value of said 4-tuple specifies a root directory in said shared file system;

a second value of said 4-tuple specifies a first subdirectory in said local file system;

a third value of said 4-tuple specifies a file creation policy that applies to said local file system; and a fourth value is an optional reference to a configuration script.

27. The computer software product according to claim 26, wherein said file creation policy specifies a step of creating said first subdirectory in said local file system.

28. The computer software product according to claim 26, wherein said file creation policy specifies a step of creating a first symbolic link in said local file system to a remote file.

29. The computer software product according to claim 26, wherein said file creation policy specifies creating in said local file system a first symbolic link to a remote subdirectory and a second symbolic link to a remote file.

30. The computer software product according to claim 26, further comprising the step of modifying at least one of said files of said application by executing said configuration script.

31. The computer software product according to claim 26, further comprising the step of modifying at least one system file by executing said configuration script.

32. The computer software product according to claim 26, wherein said step of relocating said locally installed application is performed by:

in a first event that said file creation policy specifies creation of said symbolic links, creating one of said symbolic links.

33. The computer software product according to claim 26, wherein said step of relocating said locally installed application is performed by: in a second event that said file creation policy specifies exclusive creation of subdirectories, creating said first subdirectory in said local file system.

34. The computer software product according to claim 33, wherein said step of creating said first subdirectory comprises adding said first subdirectory to a set of subdirectories to be created.

35. The computer software product according to claim 26, wherein said application file element comprises said root directory.

36. The computer software product according to claim 35, wherein said step of relocating said locally installed application is performed by successively associating application file elements of said root directory with said 4-tuple.

37. The computer software product according to claim 36, wherein said step of relocating said locally installed application is performed by recursively mapping a subtree of said local file system onto said shared file system.

38. The computer software product according to claim 36, wherein during said step of relocating said locally installed application at least a portion of said application file elements of said root directory are substituted for said first value and said second value of said 4-tuple.

39. The computer software product according to claim 26, further comprising the step of executing said configuration script.

40. The computer software product according to claim 26, wherein said step of relocating said locally installed application is performed by:

in a first event that said file creation policy specifies creation of said symbolic links, creating one of said symbolic links, and in a second event that said file creation policy specifies exclusive creation of subdirectories, creating said first subdirectory in said local file system.

41. The computer software product according to claim 40, wherein said step of creating said first subdirectory comprises adding said first subdirectory to a set of subdirectories to be created.

42. The computer software product according to claim 40, wherein said application file element comprises said root directory.

43. The computer software product according to claim 42, wherein said step of relocating said locally installed application is performed by successively associating application file elements of said root directory with said 4-tuple.

44. The computer software product according to claim 43, wherein said step of relocating said locally installed application is performed by recursively mapping a subtree of said local file system onto said shared file system.

45. The computer software product according to claim 43, wherein at least a portion of said application file elements of said root directory are substituted for said first value and said second value of said 4-tuple.

46. A computer system comprising:

A computer having a computer program instructions stored therein, wherein said instructions, when read by said computer cause said computer to deploy an application on a network for execution by at least one of a plurality of machines that are connected to said network by at least one of a, comprising the steps of:

installing an application on a local file system of exactly one of said machines;

identifying functionally read only files and read-write files of said application;

moving said functionally read only files from said local file system of said one machine to a server of a shared file system that is accessible to said machine via said network to define relocated files;

copying said read-write files to local file systems of remaining others of said machines; and establishing symbolic links on said relocated files, on said machine.

47. The computer system according to claim 46, wherein said computer is further instructed to perform the steps of:

identifying instance read/write files of said application; and establishing said instance read/write files in at least one subtree of said local file systems.

48. The computer system according to claim 46, wherein said computer is further instructed to perform the step of executing a configuration script following performance of said step of installing an application.

49. A computer system comprising:

a computer having computer program instructions are stored therein, wherein said instructions, when read by a computer, cause the computer to deploy an application on a network by executing the steps of:

installing an application on a local file system of a server to define a locally installed application; and relocating said locally installed application onto a shared file system by the steps of:

identifying shareable files among files of said application, said sharable files being shareable among multiple instances of said application;

moving said shareable files from said locally installed application to said shared file system to define relocated files; and establishing symbolic links on said server that are directed to corresponding locations of said relocated files;

wherein said step of relocating said locally installed application further comprises associating at least one application file element with a 4-tuple, wherein:

a first value of said 4-tuple specifies a root directory in said shared file system;

a second value of said 4-tuple specifies a first subdirectory in said local file system;

a third value of said 4-tuple specifies a file creation policy that applies to said local file system; and a fourth value is an optional reference to a configuration script.

50. The computer system according to claim 49, wherein said file creation policy specifies a step of creating said first subdirectory in said local file system.

51. The computer system according to claim 49, wherein said file creation policy specifies a step of creating a first symbolic link in said local file system to a remote file.

52. The computer system according to claim 49, wherein said file creation policy specifies creating in said local file system a first symbolic link to a remote subdirectory and a second symbolic link to a remote file.

53. The computer system according to claim 49, wherein said configuration scrip modifies at least one of said files of said application, wherein said files of said application are located on said local file system.

54. The computer system according to claim 49, wherein said configuration script modifies at least one of said files of said application.

55. The computer system according to claim 49, wherein said configuration script modifies at least one system file.

56. The computer system according to claim 49, wherein said step of relocating said locally installed application is performed by:

in a first event that said file creation policy specifies creation of said symbolic links, creating one of said symbolic links.

57. The computer system according to claim 49, wherein said step of relocating said locally installed application is performed by:

in a second event that said file creation policy specifies exclusive creation of subdirectories, creating said first subdirectory in said local file system.

58. The computer system according to claim 57, wherein said step of creating said first subdirectory comprises adding said first subdirectory to a set of subdirectories to be created.

59. The computer system according to claim 49, wherein said application file element comprises said root directory.

60. The computer system according to claim 59, wherein said step of relocating said locally installed application is performed by successively associating application file elements of said root directory with said 4-tuple.

61. The computer system according to claim 60, wherein said step of relocating said locally installed application is performed by recursively mapping a subtree of said local file system onto said shared file system.

62. The computer system according to claim 60, wherein during said step of relocating said locally installed application at least a portion of said application file elements of said root directory are substituted for said first value and said second value of said 4-tuple.

63. The computer system according to claim 49, further comprising the step of executing said configuration script.

64. The computer system according to claim 49, wherein said step of relocating said locally installed application is performed by:

in a first event that said file creation policy specifies creation of said symbolic links, creating one of said symbolic links; and in a second event that said file creation policy specifies exclusive creation of subdirectories, creating said first subdirectory in said local file system.

65. The computer system according to claim 64, wherein said step of creating said first subdirectory comprises adding said first subdirectory to a set of subdirectories to be created.

66. The computer software product according to claim 64, wherein said application file element comprises said root directory.

67. The computer software product according to claim 66, wherein said step of relocating said locally installed application is performed by successively associating application file elements of said root directory with said 4-tuple.

68. The computer software product according to claim 67, wherein said step of relocating said locally installed application is performed by recursively mapping a subtree of said local file system onto said shared file system.

69. The computer software product according to claim 67, wherein at least a portion of said application file elements of said root directory are substituted for said first value and said second value of said 4-tuple.

* * * * *